(12) United States Patent
Cho et al.

(10) Patent No.: US 7,695,842 B2
(45) Date of Patent: Apr. 13, 2010

(54) FUEL SUPPLY DEVICE FOR DIRECT METHANOL FUEL CELLS

(75) Inventors: Hye-jung Cho, Anyang-si (KR); Xiaobing Luo, Yongin-si (KR); Hyuk Chang, Sungnam-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1332 days.

(21) Appl. No.: 10/933,474

(22) Filed: Sep. 3, 2004

(65) Prior Publication Data

US 2005/0098217 A1  May 12, 2005

(30) Foreign Application Priority Data

Sep. 5, 2003  (KR) .................. 10-2003-0062244

(51) Int. Cl.
*H01M 2/00* (2006.01)
*H01M 8/10* (2006.01)

(52) U.S. Cl. .......................................... 429/34; 429/30
(58) Field of Classification Search ............ 137/656.01, 137/613; 429/34–39
See application file for complete search history.

(56) References Cited

U.S. PATENT DOCUMENTS

| 2,980,032 | A  |   | 4/1961 | Schneider |  |
|---|---|---|---|---|---|
| 6,447,941 | B1 | * | 9/2002 | Tomimatsu et al. | 429/26 |
| 6,596,422 | B2 | * | 7/2003 | Ren | 429/13 |
| 2003/0143444 | A1 | * | 7/2003 | Liu et al. | 429/19 |

FOREIGN PATENT DOCUMENTS

| EP | 1349227 A2 | 10/2003 |
|---|---|---|
| WO | 0145189 A1 | 6/2001 |
| WO | 02099916 A2 | 12/2002 |
| WO | 03102906 A2 | 2/2003 |

\* cited by examiner

*Primary Examiner*—Dah-Wei D Yuan
*Assistant Examiner*—Maria J Laios
(74) *Attorney, Agent, or Firm*—Sughrue Mion, PLLC

(57) ABSTRACT

A fuel supply device for direct methanol fuel cells. The fuel supply device for direct methanol fuel cells includes a fuel tank to store a liquid fuel, a cavity plate to store the liquid fuel transferred from the fuel tank, a thin film type active pump welded on the bottom of the cavity plate to bring about a movement of the cavity plate, and a nozzle plate disposed on the cavity plate to eject the liquid fuel. Accordingly, it is possible to actively control a liquid fuel in a needed amount and supply it to a fuel cell in accordance with a use mode of an electronic device and effectively remove by-products of the fuel cell, thereby improving the efficiency of the fuel cell.

24 Claims, 7 Drawing Sheets

FUEL SUPPLY DEVICE FOR DIRECT METHANOL FUEL CELLS

CROSS REFERENCE TO RELATED APPLICATION

This application claims to the benefit of Korean Application No. 2003-62244 filed Sep. 5, 2003, in the Korean Intellectual Property Office, the disclosure of which is incorporated herein by reference.

BACKGROUND OF THE INVENTION

1. Field of the Invention

Apparatuses consistent with the present invention relate generally to a fuel supply device for direct methanol fuel cells and more particularly, to a fuel supply device for direct methanol fuel cells comprising a cavity and a thin film type active pump and nozzles so as to actively supply a liquid fuel in a predetermined amount by receiving a signal from an external circuit.

2. Description of the Related Art

Recently, as use of notebooks, mobile phones, and PDAs is universalized, concern for energy sources of such portable electronic equipment or devices is increased. The cells used for portable electronic devices are required to be small-sized as the devices are miniaturized and to have a long usable time by a single supply. To meet these requirements, various types of cells have been developed.

Among the developed cells, fuel cells are of particular interest since they advantageously have a higher energy density per unit area, as compared to the conventional secondary cells, and can be used for a longer period of time by a single charge, as compared to the conventional cells. Also, since the fuel cells can maximize mobility of charging methods and be used semi-permanently, they are environmentally friendly energy sources which are expected to greatly contribute to the recent trend to make electronic devices portable, and slim and light.

The fuel cells are classified by fuel types, operation temperature, catalyst and electrolyte types, including for example, a phosphoric acid fuel cells (PAFC), alkaline fuel cells (AFC), polymer electrolyte fuel cells (Proton Exchange Membrane Fuel Cell, PEMFC), molten carbonate fuel cells (MCFC), solid oxide fuel cells (SOFC), direct methanol fuel cells (DMFC).

The direct methanol fuel cells are characterized by bringing about a chemical reaction to generate energy at room temperature. Also, they are advantageous in that they do not need a separate high performance apparatus for storing hydrogen since hydrogen is supplied from the liquid fuel.

The recharge of the fuel is simply accomplished by carrying or mounting a methanol capsule. Therefore, they can improve mobility.

Figure 1:
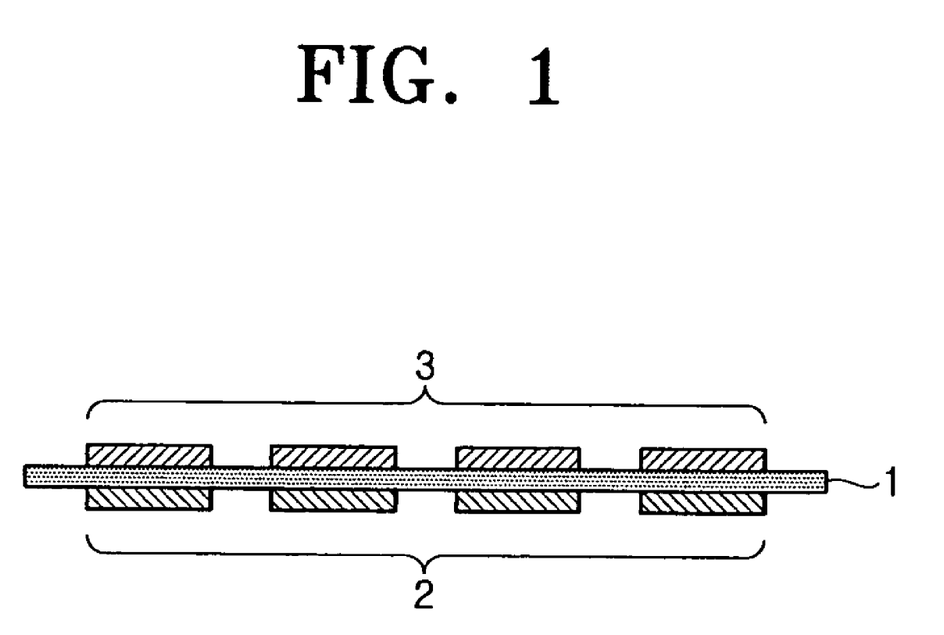
FIG. 1 is a schematic view showing a direct methanol fuel cell.

As shown in FIG. 1, the direct methanol fuel cells comprise a membrane electrode assembly that includes an anode 2, a membrane 1 and a cathode 3. In the anode 2, the methanol reacts with water to produce hydrogen ions and electrons. Such reaction is shown in the following Reaction Scheme (I).

$$CH_3OH + H_2O \rightarrow CO_2 + 6H^+ + 6e^-$$  Reaction Scheme I

In the cathode 3, the hydrogen ions produced in the anode 2 are transferred through the membrane and binds to oxygen along with electrons to produce water. The reaction is as follows.

$$1.5O_2 + 6H^+ + 6e^- \rightarrow 3H_2O$$  Reaction Scheme II

The overall chemical reaction in the fuel cell is shown in Reaction Scheme III.

$$CH_3OH + 1.5O_2 \rightarrow CO_2 + 2H_2O, \quad E0 = 1.18\ V$$  Reaction Scheme III As described above, the direct methanol fuel cells convert the energy generated in the overall chemical reaction to electrical energy and supply the converted energy to an electronic device.

The energy is generated by the chemical reaction of hydrogen ions from the methanol, which is properly supplied, with oxygen ions in the air. Typically, a mixture of methanol and water is used to obtain a needed amount of hydrogen. Here, if a methanol mixture at a high concentration is excessively supplied, a surplus methanol mixture passes through a membrane of the fuel cell without reaction (cross-over phenomenon), causing rapid deterioration in the efficiency of the fuel cell.

Also, the energy generation should be controlled in accordance with the operation mode of a small-sized electronic device, for example, the on mode, off mode and standby mode. For this, it is necessary to control the supplied amount of the liquid fuel.

Thus, there is a demand for an intellectualized fuel supply system applicable in small sized portable electronic devices which can actively control the liquid methanol in accordance with the conditions and environments in which the electronic devices are used.

SUMMARY OF THE INVENTION

Accordingly, it is an aspect of the present invention to provide a fuel supply device for direct methanol fuel cells which can actively supply a proper quantity of a liquid fuel in accordance with a mode of an electronic piece of equipment or an electronic device to which the fuel cell is applied.

In order to accomplish the above aspect and/or other features of the present invention, a non-limiting fuel supply device for direct methanol fuel cells according to the present invention comprises a fuel tank to store a liquid fuel, a cavity plate to store the liquid fuel transferred from the fuel tank, a thin film type active pump welded on the bottom of the cavity plate to bring about a movement of the cavity plate, and a nozzle plate disposed on the cavity plate to eject the liquid fuel.

It is contemplated that the fuel tank comprises a fuel tank body and a porous medium through which the liquid fuel is absorbed and transferred. The fuel tank is capable of being attached to and detached from the cavity plate. The cavity plate comprises a fuel supply port, through which the fuel supplied from the fuel tank is transferred, a plurality of micro-channels connected to the fuel supply port, through which the fuel from the fuel supply port is transferred, and at least one cavity connected to the micro-channels to store the fuel transferred through the micro-channels.

It is also contemplated that the cavity and the micro-channels have their bottoms closed and their tops opened. The fuel supply port has the porous medium inserted and bonded to the inside. The number of the cavities is two or more and the respective cavities are provided to be parallel to the fuel supply port and a plurality of micro-channels is further provided as a fuel passage between the cavities.

It is further contemplated that the cavity has an inner pressure of a negative pressure. The thin film type active pump is welded at a position corresponding to the cavity. The thin film type active pump moves in the lateral direction or longitudinal direction.

The cavity plate moves in the longitudinal direction respect to the lateral directional movement of the thin film type active pump or moves in the longitudinal direction according to the longitudinal directional movement of the thin film type active pump.

According to a further non-limiting aspect of the present invention, the nozzle plate comprises at least one current collector part coated at a predetermined region, a plurality of nozzles to eject the fuel upward, and a plurality of channels to discharged carbon dioxide and vapor transferred from the above, in which the nozzles and the channels are formed on the current collector part.

It is additionally contemplated that the plurality of nozzles is formed at a position corresponding to the cavity. The channels have one end opened at a side of the nozzle plate to discharge carbon dioxide and vapor and the other end closed. The plurality of channels is parallel to each other and has an end opened, in which the opened ends in the adjacent channels are opposite to each other. The plurality of nozzles is arranged in at least one row and the plurality of channels is formed parallel to the rows of the nozzles.

According to a further aspect of the present invention, at least 3 groups of successive rows of the nozzles are formed and the channels are formed between the groups of the successive rows of the nozzles, in which the opened ends of adjacent channels are opposite to each other.

The current collector part may be formed by coating a metal on the nozzle plate. For example, the current collector part may be formed by coating Au or an Au alloy on the nozzle plate.

It is also contemplated that the fuel supply device comprises a supplementary plate between the cavity plate and the nozzle plate, in which the supplementary plate has open parts at positions corresponding to the cavity.

The fuel supply device further comprises a nozzle supplementary plate having a plurality of holes at positions corresponding to the nozzles on the nozzle plate.

BRIEF DESCRIPTION OF THE DRAWINGS

The above-mentioned object and the feature of the present invention will be more apparent by describing illustrative, non-limiting embodiments of the present invention by referring to the appended drawings, in which.

DETAILED DESCRIPTION OF ILLUSTRATIVE, NON-LIMITING EMBODIMENTS OF THE INVENTION

Hereinbelow, embodiments of the present invention will be described in greater detail with reference to the accompanying drawings.

In all drawings referred to in the following description, elements having the same functions are indicated by the same reference numerals.

Figure 2A:
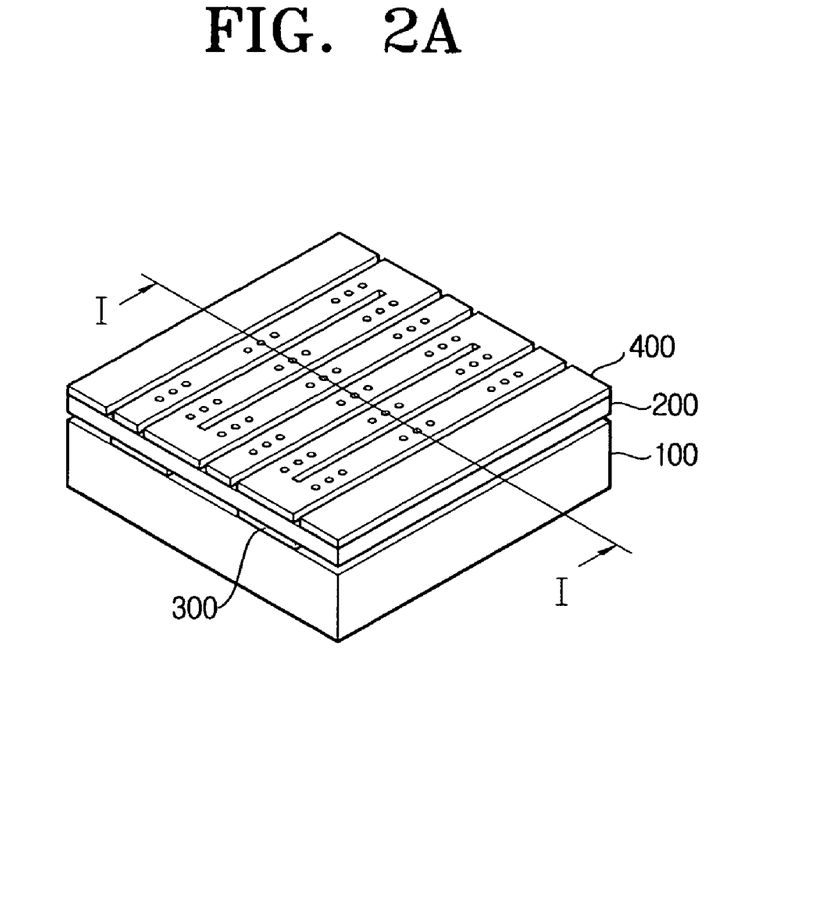
FIG. 2A is a schematic view showing a fuel supply device for direct methanol fuel cells according to an embodiment of the present invention.
Figure 2B:
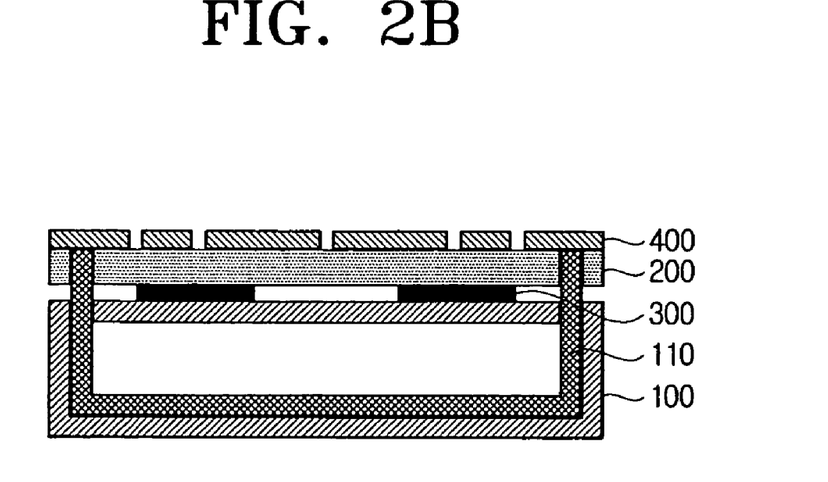
FIG. 2B is a cross sectional view taken from the I-I line.

FIG. 2A shows an embodiment of the liquid fuel supply device for direct methanol fuel cells according to the present invention and FIG. 2B is a cross-sectional view taken from the I-I line.

In FIGS. 2A and 2B, the fuel supply device according to the present invention comprises a fuel tank 100, a cavity plate 200, a thin film type active pump 300, and a nozzle plate 400. The cavity plate 200 is formed on the fuel tank 100 and the thin film type active pump 300 is welded on the bottom of the cavity plate 200. On the cavity plate 200, the nozzle plate 400 is formed.

The fuel tank 100 comprises a fuel tank body (not shown) and a porous medium 110 disposed therein. The porous medium 110 absorbs and pulls up a liquid fuel stored in fuel tank 100. The porous medium 110 has both ends bonded to the cavity plate 200, whereby the liquid fuel, which has been absorbed and pulled up by the porous medium 110, is transferred to the cavity plate 200 connected to the porous medium 110 and stored therein.

The cavity plate 200 moves up-and-down according to the action of the thin film type active pump 300 welded on the bottom thereof. By the up-and-down movement of the cavity plate 200, the liquid fuel stored in the cavity plate 200 is ejected upward.

On the cavity plate 200, the nozzle plate 400 is disposed. The liquid fuel transferred upward from the cavity plate 200 is then ejected through the nozzle plate 400 upward from the nozzle plate 400.

Figure 3A:
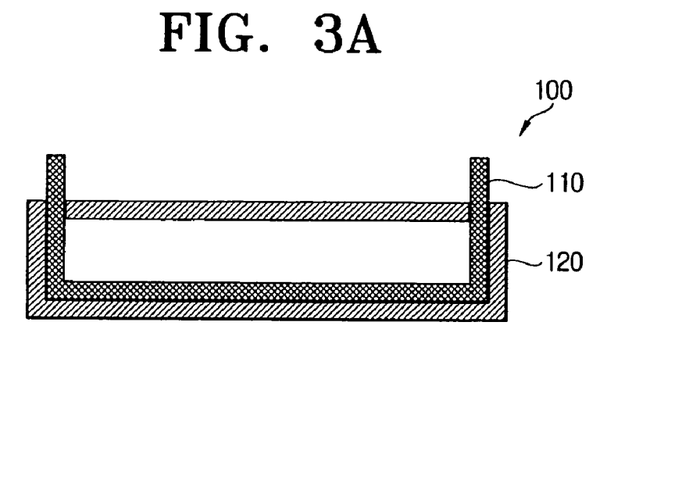
FIGS. 3A, 3B and 3C are cross-sectional views of various embodiments of the fuel tank of FIG. 2A.
Figure 3B:
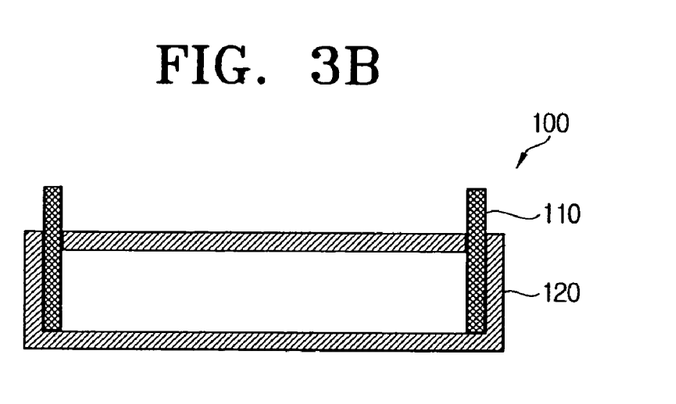
Figure 3C:
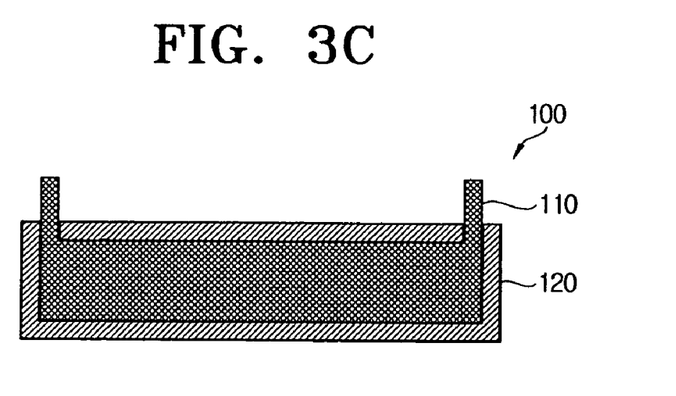

FIGS. 3A, 3B and 3C are cross-sectional views of various embodiments of the fuel tank of FIG. 2A.

Referring to FIGS. 3A, 3B and 3C, the fuel tank 100 comprises a fuel tank body 120 and a porous medium 110. The porous medium 110, for example, may be formed along the inner walls and the bottom of the fuel tank body 120 as shown in FIG. 3A; be formed as two plates along the inner walls of the fuel tank body 120, opposite to each other, as shown in FIG. 3B; or be formed as a structure to fill the inside of the fuel tank body 120, as shown in FIG. 3C. In addition, the medium can be formed in various shapes.

According to the present invention, the fuel tank 100 may have a structure capable of attaching to or detaching from the cavity plate 200. The porous medium 110 has both its ends inserted into a fuel supply port (not shown) of the cavity plate 200. By this, the fuel tank 100 can attach to and detach from the cavity plate 200.

The fuel tank 100 may be provided at a part of the fuel tank body 120 with a fuel inlet, through which liquid fuel can be injected. When all the liquid fuel stored in the fuel tank 100 is consumed, the fuel tank 100 is detached from the cavity plate 200, recharged with a liquid fuel from the outside and then attached to the cavity plate 200 for use. Thus, it is possible to recharge the fuel supply device and use it semi-permanently.

Examples of the porous medium 110 which can be used, include a foamed body, bundled fiber, matted fiber, woven fiber, non-woven fiber or inorganic porous material, but are not limited thereto. The numerous micropores in the porous medium 110 produce a capillary effect so that the liquid fuel stored in the fuel tank is absorbed into the porous medium. The porous medium is extended beyond the fuel tank and connected to the cavity plate via the fuel supply port. Thus, the liquid fuel is transferred by the porous medium as a passage.

Figure 4A:
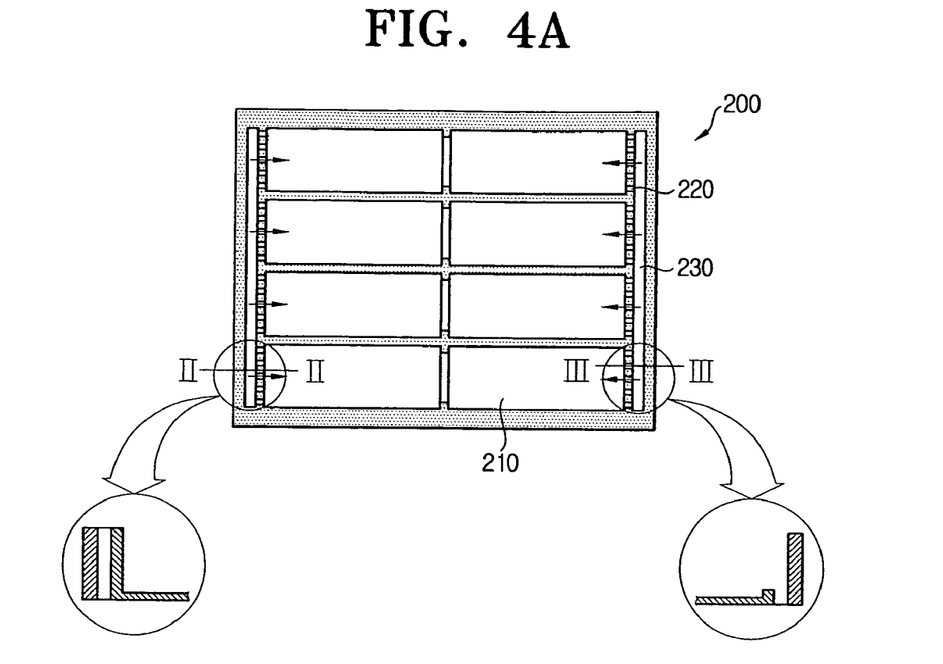
FIGS. 4A and 4B are plan views showing different embodiments of the cavity plate of FIG. 2A.
Figure 4B:
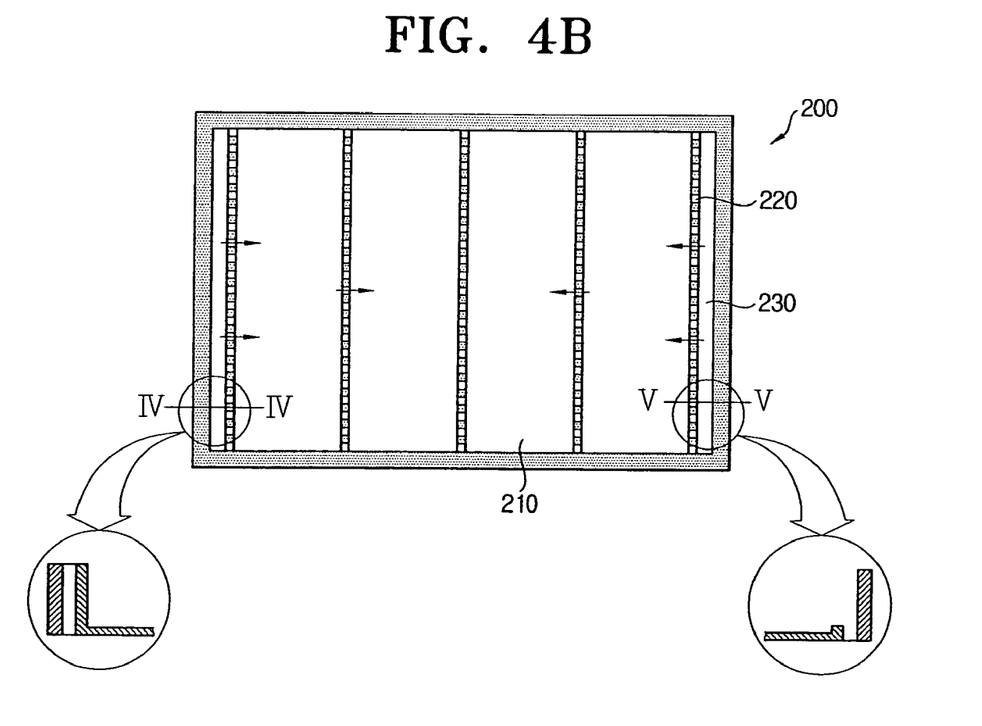

FIGS. 4A and 4B are plan views showing different embodiments of the cavity plate of FIG. 2A.

Referring to FIGS. 4A and 4B, the cavity plate 200 comprises cavities 210 to store a liquid fuel, fuel supply port 230 having the porous medium of the fuel tank inserted therein, through which the liquid fuel is supplied from the porous medium. Micro channels 220 are provided to suck the liquid fuel from the fuel supply port 230 by capillary force and transfer the liquid fuel to the cavity 210. The arrow in the drawing refers the direction in which the fuel is transferred through the micro-channels 220.

The fuel supply port 230 is formed to have upper and lower ends which are open so that porous medium is inserted to supply the liquid fuel. In the enlarged cross-sectional view taken from the II-II line of FIG. 4A and the enlarged cross-sectional view taken from the IV-IV line of FIG. 4B, the fuel inlet 230 and the cavity 210 are shown. The liquid fuel which has been transferred through the porous medium extended to the inside of the fuel tank is supplied into the cavity plate 200 through fuel inlets 230.

The fuel inlets 230 are connected to the micro-channels 220. In the enlarged cross-sectional view taken from the III-III line of FIG. 4A and the enlarged cross-sectional view taken from the V-V line of FIG. 4B, the connection relationship of the fuel supply port 230 with the micro-channels 220 and the cavity is shown. The micro-channels 220 formed in a micro path act as a fuel supply passage. Since the micro-channels 220 have a fine inner diameter, they suck the liquid fuel transferred from the fuel supply port 230 by capillary force, like the porous medium. The micro-channels 220 are connected to the cavity 210, whereby the liquid fuel sucked through the micro-channels 220 is stored in the cavity 210. Meanwhile, the micro-channels 220 also prevent the liquid fuel stored in the cavity 210 from flowing back to the fuel supply port 230.

The inside of the cavity 210 may have a negative pressure with respect to the pressure of the outside. When the pressure inside the cavity 210 turns negative, the liquid fuel stored in the cavity 210 is prevented from flowing back to the fuel supply port 230.

In accordance with the membrane arrangement of a fuel cell system to which the fuel supply device is applied, the shape and number of the cavities 210 are determined. It is preferable, but not necessary, that the cavity 210 is formed as a shape identical to the fuel cell at a position corresponding to each membrane so that the liquid fuel can be readily supplied to the fuel cell, whereby leakage of the liquid fuel can be prevented. Therefore, it is possible to provide various embodiments of the cavities 210 depending on the membrane arrangement to which the fuel supply device is applied, as would be appreciated by one skilled in the art.

The cavity plate 200 shown in FIG. 4A comprises a wall between two adjacent cavities 210 parallel to each other. The cavity plate 200 shown in FIG. 4B comprises a plurality of micro-channels 220 between adjacent cavities 210 parallel to each other. The micro-channels 220 may be formed to be identical to the micro-channels connected to fuel supply port 230 and suck the liquid fuel stored in the cavity 210 at the edges by capillary force and transfer it to an inner cavity.

The cavity 210 may also be modified to ease production, or according to a particular type of electronic device provided.

On the bottom of the cavity plate, a thin film type active pump 300 is welded. The thin film type active pump 300 is connected to a circuit of an electronic device to which the fuel supply device is applied. In accordance with the present invention, the electronic device has different modes according to its state of use, such as on, off and standby modes. It may be necessary to control the amount of the fuel to be supplied to the electronic device according to the mode state.

When the electronic device is in on mode, the fuel should be efficiently supplied and thus, the fuel supply rate to the fuel cell from the cavity 210 through the nozzle should be fast. On the other hand, when the electronic device is in the off mode, the fuel supply should be moderated and when the electronic device is in the standby mode, the fuel supply is more than the off mode but less than the on mode.

A mode signal of the electronic device is transmitted to the thin film type active pump 300. The thin film type active pump 300 moves in accordance with the mode signal of the electronic device. When the mode signal of the electronic device received by the pump 300 is the on mode signal, the pump 300 makes a lateral or longitudinal oscillating movement in accordance with movement set for the on mode. On the other hand, when the received signal is the standby mode signal, the pump 300 makes a lateral or longitudinal oscillating movement in accordance with movement set for the standby mode.

As the thin film type active pump 300 oscillates in the lateral direction or in the longitudinal direction, the cavity plate 200 on which the pump 300 is welded makes a longitudinal movement, that is, oscillating upward and downward. By the longitudinal movement of the cavity plate 200, the liquid fuel stored in the cavity 210 is ejected through nozzles to a fuel cell disposed on a nozzle plate 400.

The amount of the liquid fuel ejected from the cavity 210 upon the directional movement of the cavity plate 200 may be preset to a certain amount to supply a proper amount of the liquid fuel in accordance with a mode of the electronic device. More particularly, when the thin film type active pump 300 receives a mode signal of the electronic device, it makes a lateral movement or longitudinal movement which is set for the received mode signal. By the lateral movement or longitudinal movement of the thin film type active pump 300, the cavity plate undergoes a longitudinal movement, whereby the liquid fuel stored in the cavity 210 is ejected. Thus, it is possible to control the ejected amount of the liquid fuel according to the mode signal of the electronic device.

After a predetermined amount of the liquid fuel is ejected from the cavity 210, the pressure inside the cavity 210 is lowered and the micro-channels 220 connected to the porous medium 110 and the fuel supply port 230 continuously suck in the liquid fuel. The sucked liquid fuel is transferred and supplied to the cavity 210.

Meanwhile, when the electronic device is in the off mode, the thin film type active pump 300 does not move, whereby the cavity plate 200 does not move. However, the porous medium 110 and the micro-channels 220 continuously suck the liquid fuel and transfer it to the cavity 210. Therefore, the cavity 210 may always contain a predetermined amount of the liquid fuel. The liquid fuel stored in the cavity 210 is continuously supplied to a fuel cell through nozzles at a slow rate. Accordingly, the supply of the liquid fuel is not suspended, even when the electronic device is in the off mode. When the fuel supply is discontinued, the membrane in the fuel cell is dried, which may cause problems in the fuel cell. Therefore, it is necessary for fuel supply device to supply a fuel to a fuel cell.

Figure 5A:
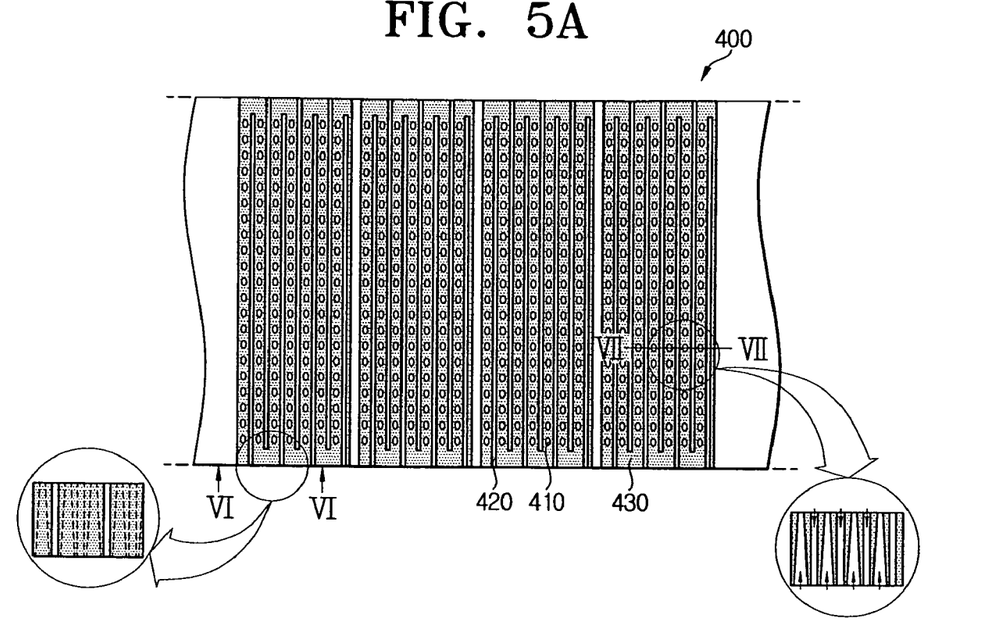
FIGS. 5A and 5B are plan views showing different embodiments of the nozzle plate of FIG. 2A.
Figure 5B:
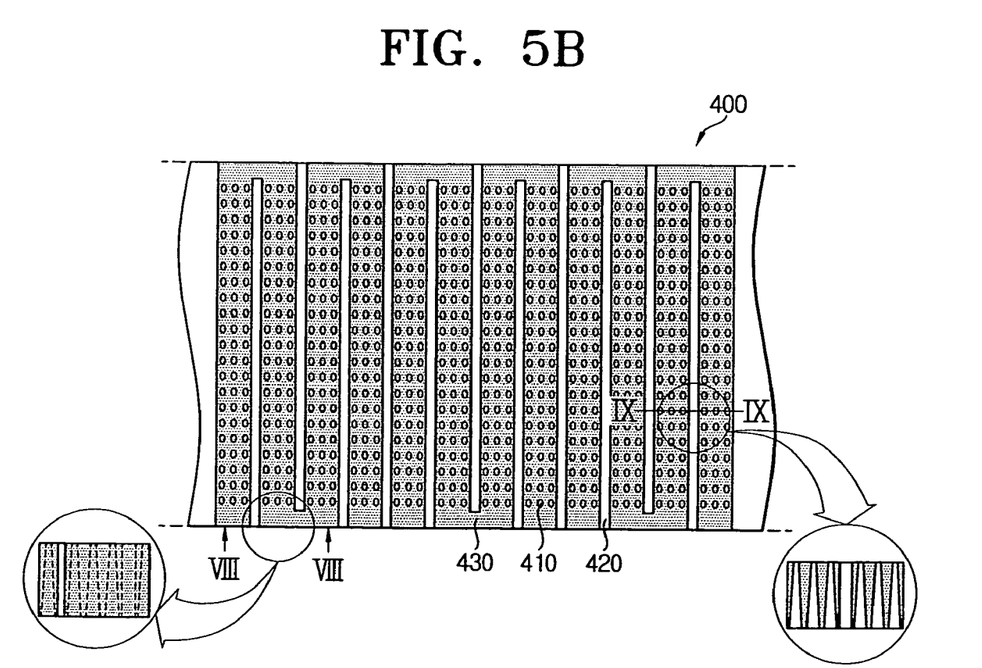

FIGS. 5A and 5B are plan views showing different embodiments of the nozzle plate of FIG. 2A.

The nozzle plate 400 shown in FIGS. 5A and 5B comprises a current collector part 430, and a plurality of nozzles 410 and a plurality of channels 420 which are formed on the current collector part 430.

Referring to FIGS. 5A and 5B, the current collector part 430 is formed at a position corresponding to a fuel cell disposed on the nozzle plate 400 and to the cavities 210 of the cavity plate 200 disposed under the nozzle plate 400. The current collector part 430 collects the current generated by a chemical reaction in the fuel cell disposed on the nozzle plate 400. Therefore, the current collector part 430 is formed by being coated with a conductive metal.

The current collector part 430 is firstly formed at a predetermined place on the nozzle plate 400 and the nozzles 410 are formed at positions corresponding to the cavities 210 disposed under the nozzle plate. The nozzles 410 are formed using a known method such as etching. A plurality of nozzles 410 is formed along the longitudinal direction of the fuel supply port 230 on the cavity plate 200, in which rows of nozzles 410 are parallel to each other.

The nozzles 410 are passages through which the liquid fuel transferred from the cavity 210 disposed below is supplied to a fuel cell. The liquid fuel is uniformly supplied in a predetermined rate and amount to the fuel cell by virtue of the structure of the nozzles 410. The nozzles 410 may have the same diameter at a lower part and upper part alike. However, it is preferable, but not necessary, that the nozzles 410 have a larger diameter at the lower part and a smaller diameter toward the upper part to prevent a counter current. Therefore, the liquid fuel, once ejected from the nozzles 410, is all supplied to the fuel cell without flowing backward to the cavity.

Channels 420 are formed on the current collector part 430 to be parallel to the set forth rows of the nozzles 410. The channels 420 are formed, for example, in the form of a groove having a top and bottom and one end opened. The channels 420 are provided to transfer carbon dioxide and vapor as by-products of the chemical reaction in the fuel cell disposed on the nozzle plate 400. Carbon dioxide and vapor generated as by-products from the chemical reaction in the fuel cell should be removed immediately after their production to progress the reaction in the fuel cell, thereby improving the efficiency of the fuel cell. Once carbon dioxide and vapor are transferred to the nozzle plate 400, they are transferred to channels 420 without flowing into the nozzles 410 because of the characteristic structure of the nozzles 410.

The channels 420 have one end open at a side of the nozzle plate 400 so that the introduced carbon oxide and vapor can be discharged through the side of the nozzle plate 400. The other end is closed for connecting with the current collector part 430. At least two channels 420 are formed and adjacent channels may have open ends at sides opposite to each other.

The enlarged cross-sectional view taken from the VI-VI line of FIG. 5A and the enlarged cross-sectional view taken from the VIII-VIII line of FIG. 5B show the nozzles and the channels on side cross-sectional views of the nozzle plate 400. The enlarged cross-sectional view taken from the VI-VI line of FIG. 5A and the enlarged cross-sectional view taken from the IX-IX line of FIG. 5B show the nozzles and channels in the partial cross-sectional view of the nozzle plate 400. Visible parts are marked with a solid line and invisible parts are marked with a dotted line. As shown in the enlarged cross sectional view taken from the VI-VI line and the enlarged cross sectional view taken from the VII-VIII line, two adjacent channels 420 having an opened end and a non-opened end are repeatedly formed.

On one current collector part 430, at least three groups comprising at least one row of nozzles 410 are formed. Between two adjacent groups of nozzle rows, a channel 420 having one end opened is formed, in which the open end is opposite to an open end of an adjacent channel 420. Therefore, in the configuration on the plane of the current collector part 430, the rows of nozzles 410 and channels 420 form a regular pattern of a "ㄹ" shape or a continuous "ㄹ" shape.

This is because the current collector part 430 is an element to collect current generated in the fuel cell disposed above, in which the current generated in the fuel cell is a direct current type. That is, the current collector part 430 should be formed as a direct current type for the direct current generated in the fuel cell.

Referring to FIG. 5A, a plurality of nozzles 410 are arranged in a row and a channel 420 is disposed adjacent to the row of the nozzles 410. Referring to FIG. 5B, a plurality of nozzles 410 are arranged in three rows and a channel 420 is disposed adjacent to the rows of the nozzles 410. These patterns of the current collector part 430 may be varied depending on the ease of production and viscosity of the liquid fuel. As will be appreciated, various modifications can be made, in addition to the pattern shown in the drawing.

The nozzles 410 on the nozzle plate 400 are for supplying a liquid fuel from the underside to a fuel cell disposed above. The channels 420 on the nozzle plate 400 are for removing carbon dioxide and vapor introduced from the above.

Materials, which can be used as the nozzle plate 400, are not limited. The nozzle plate 400 has a part coated with a metal, which does not form the current collector part 430 and forms a wall. The wall closes the nozzle plate 400 at a position corresponding to a micro-channel 220 of the cavity plate 200 disposed below and thus, serves as a cover of the micro-channel 220. Therefore, the nozzle plate 400 can prevent the liquid fuel from leaking through the micro channel which has its top opened.

Though the nozzle plate 400 serves as a cover of the micro-channel 220, the liquid fuel may flow over the opened top of the micro-channel and leak through a part where the cavity plate 200 and nozzle plate 400 contact each other. In order to prevent this leakage, the fuel supply device may further comprise a supplementary plate between the cavity plate 200 and the nozzle plate 400.

Figure 6A:
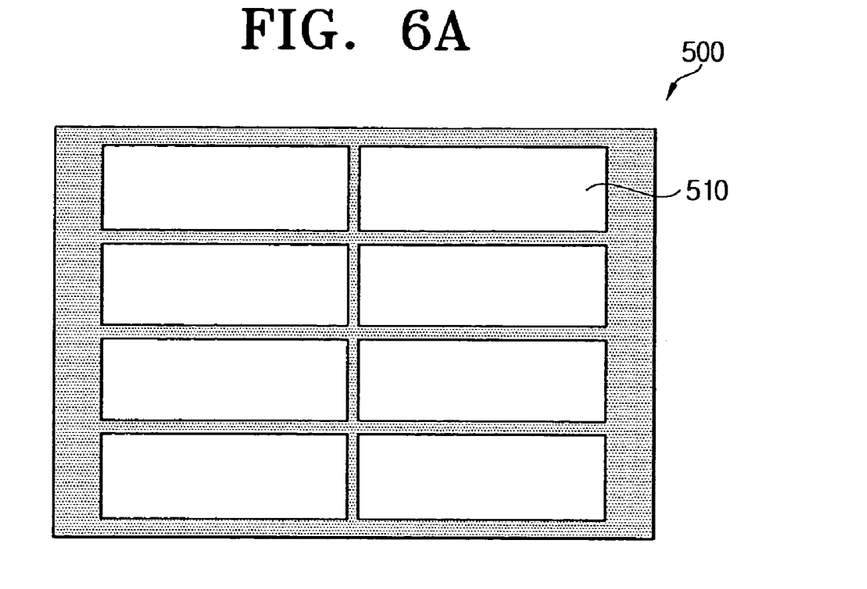
FIGS. 6A and 6B are plan views of various the supplementary plate of the cavity.
Figure 6B:
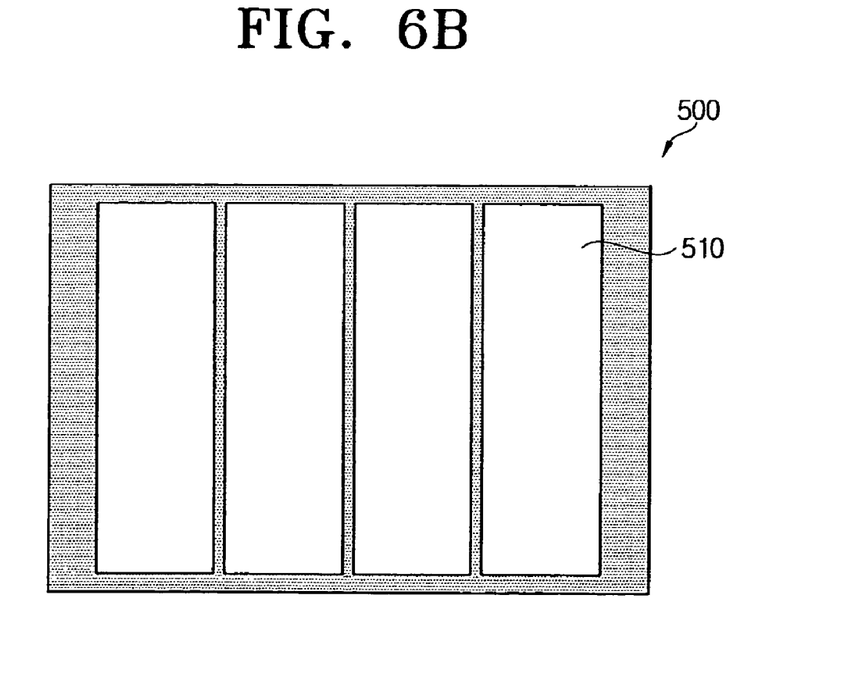

Referring to FIGS. 6A and 6B, the supplementary plate 500 has open parts 510 at positions corresponding to the cavity 210 and the rest having a closed wall structure. The liquid stored in the cavity 210 is prevented from flowing upward except for flowing upward through the open part. Therefore, the leakage of the liquid fuel through the micro-channels can be prevented.

Figure 7:
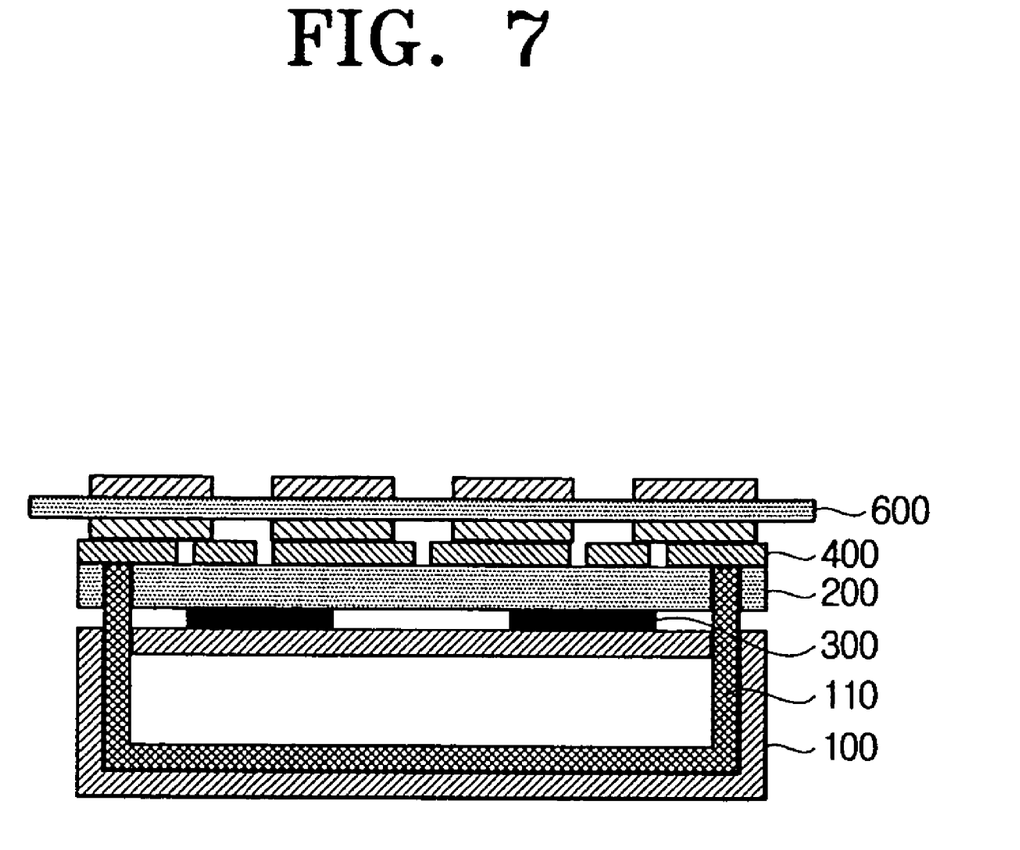
FIG. 7 shows the fuel supply device for direct methanol fuel cells of FIG. 2B with a fuel cell attached thereto.

FIG. 7 shows the fuel supply device for direct methanol fuel cells according to the present invention used with a fuel cell.

Referring to FIG. 7, a fuel cell 600 is attached on a nozzle plate 400. A porous medium 110 is inserted in and bonded to fuel supply port of a cavity plate 200 to absorb a liquid fuel stored in a fuel tank 100. The liquid fuel passes through the fuel inlet via the porous medium 110 and is transferred to cavities 210 of the cavity plate 200 through micro-channels connected to the fuel supply port.

Though not shown in the drawing, a nozzle supplementary plate having a plurality of openings at positions corresponding to nozzles may be disposed between the nozzle plate and the fuel disposed thereon. By employing the nozzle supplementary plate, the liquid fuel supplied to the fuel cell from the nozzle plate through the nozzles and the openings of the nozzle supplementary plate may form a liquid column.

Also, it is possible to supply the liquid fuel by droplet injection by adjusting the distance between the nozzle plate and the fuel cell disposed thereon.

The selection of the form of the supplied liquid fuel between the liquid column and the droplet injection depends on an electronic device to which the liquid fuel is supplied. Thus, in the case of an electronic device requiring a system having a fast liquid fuel supply rate, it is preferable, but not necessary, to use a fuel supply device for direct methanol fuel cells further comprising a nozzle supplementary plate on the nozzle plate so that the liquid fuel is supplied in the form of a liquid column. In case of an electronic device requiring a system having a low liquid fuel supply rate, it is preferable, but not necessary, to use a fuel supply device for direct methanol fuel cells having a space between the nozzle plate and the fuel cell so that the liquid fuel is supplied by droplet injection.

The cavity plate 200 moves in the longitudinal direction by the lateral directional movement or longitudinal directional movement of the thin film type active pump 300 which is welded on the cavity plate 200 and makes an oscillating movement by receiving a mode signal from the electronic device. The liquid fuel stored in the cavity is ejected upward from the cavity 210 of the cavity plate 200 by the longitudinal directional movement of the cavity plate 200.

The liquid fuel ejected from the cavity 210 of the cavity plate 200 is supplied to a fuel cell 600 through the nozzles of the nozzle plate 400. In the fuel cell 600 supplied with the liquid fuel, chemical reactions take place, as descried in the Reaction Scheme (III). The current generated by the chemical reactions is collected in the current collector part of the nozzle plate 400 and supplied to the electronic device, while carbon dioxide and vapor as by-products of the chemical reactions are discharged to the outside through channels of the nozzle plate 400.

Thus, it is possible to actively supply the liquid fuel as needed, and to immediately remove by-products generated in the fuel cell, thereby improving the efficiency of the fuel cell.

According to the present invention as described above, by employing a cavity plate to store a liquid fuel in a predetermined amount and a thin film type active pump welded on the bottom of the cavity plate to receive a mode signal from an electronic device, it is possible to effectively provide a fuel supply device for direct methanol fuel cells which can actively control and supply a liquid fuel in a needed amount to a fuel cell in accordance with a mode of the electronic device. Also, according to the present invention, by employing a nozzle plate, it is possible to effectively remove by-products generated in the fuel cell, thereby improving the efficiency of the fuel cell.

Although exemplary embodiments of the present invention have been shown and described, it will be understood by those skilled in the art that the present invention should not be limited to the described exemplary embodiments, but various changes and modifications can be made without departing from the scope of the present invention claimed by the appended claims. Of course, such changes and modifications are within the scope defined in the claims.

What is claimed is:

1. A direct methanol fuel cell comprising a fuel supply device comprising:
   a fuel tank to store a liquid fuel;
   a cavity plate to store the liquid fuel transferred from the fuel tank;
   a thin film active pump attached to a bottom of the cavity plate to bring about a movement of the cavity plate; and
   a nozzle plate disposed on the cavity plate to eject the liquid fuel.

2. The direct methanol fuel cell according to claim 1, in which the fuel tank comprises a fuel tank body and a porous medium through which the liquid fuel is absorbed and transferred, wherein the porous medium is disposed in the fuel tank body and extends out of the fuel tank body into the cavity plate.

3. The direct methanol fuel cell according to claim 1, in which the fuel tank is capable of being attached to and detached from the cavity plate.

4. The direct methanol fuel cell according to claim 1, in which the cavity plate comprises:
   a fuel supply port formed at one edge of the cavity plate, through which the liquid fuel supplied from the fuel tank is transferred;
   a plurality of micro-channels connected to the fuel supply port, through which the liquid fuel from the fuel supply port is transferred; and
   at least one cavity connected to the micro-channels to store the fuel transferred through the micro-channels.

5. The direct methanol fuel cell according to claim 4, in which the cavity and the micro-channels respectively have bottoms which are closed and tops which are open.

6. The direct methanol fuel cell according to claim 4, in which a porous medium is bonded to an inside of the fuel supply port.

7. The direct methanol fuel cell according to claim 4, in which 2 or more of the cavities are provided to be parallel to the fuel supply port and a plurality of micro-channels is further provided as a fuel passage between the cavities.

8. The direct methanol fuel cell according to claim 1, in which the cavity plate includes at least one cavity and has an inner pressure of a negative pressure.

9. The direct methanol fuel cell according to claim 1, in which the cavity plate includes at least one cavity, and the thin film active pump is attached at a position corresponding to the at least one cavity.

10. The direct methanol fuel cell according to claim 1, in which the thin film active pump moves in a lateral direction or longitudinal direction.

11. The direct methanol fuel cell according to claim 10, in which the cavity plate moves in at least one of a longitudinal direction with respect to the lateral directional movement of the thin film active pump and moves in a longitudinal direction according to the longitudinal directional movement of the thin film type active pump.

12. The direct methanol fuel cell according to claim 1, in which the nozzle plate comprises:
   at least one current collector part coated at a predetermined region;
   a plurality of nozzles to eject the fuel upward; and
   a plurality of channels to discharge carbon dioxide and vapor transferred from above, in which the nozzles and the channels are formed on the current collector part.

13. The direct methanol fuel cell according to claim 12, in which the cavity plate includes at least one cavity and the plurality of nozzles is formed at a position corresponding to the at least one cavity.

14. The direct methanol fuel cell according to claim 12, in which the channels have one end opened at a side of the nozzle plate to discharge carbon dioxide and vapor and the other end closed.

15. The direct methanol fuel cell according to claim 14, in which the plurality of channels is parallel to each other and have an end opened, in which the opened ends in the adjacent channels are opposite to each other.

16. The direct methanol fuel cell according to claim 12, in which the plurality of nozzles is arranged in at least one row and the plurality of channels is formed parallel to the at least one row of nozzles.

17. The direct methanol fuel cell according to claim 16, in which at least 3 groups of successive rows of the nozzles are formed and channels are formed between the groups of the successive rows of the nozzles, in which opened ends of adjacent channels are opposite to each other.

18. The direct methanol fuel cell according to claim 12, in which the current collector part is formed by coating a metal on the nozzle plate.

19. The direct methanol fuel cell according to claim 18, in which the current collector part is formed by coating Au or Au alloy on the nozzle plate.

20. The direct methanol fuel cell according to claim 1, in which the cavity plate includes at least one cavity, and in which the fuel supply device further comprises a supplementary plate between the cavity plate and the nozzle plate, in which the supplementary plate has open parts at positions corresponding to the at least one cavity.

21. The direct methanol fuel cell according to claim 1, which further comprises a nozzle supplementary plate having a plurality of openings at positions corresponding to the nozzles on the nozzle plate.

22. The direct methanol fuel cell according to claim 12, in which the plurality of channels is parallel to each other and have an end opened, in which the opened ends in the adjacent channels are opposite to each other.

23. The direct methanol fuel cell according to claim 12, in which at least 3 groups of successive rows of the nozzles are formed and channels are formed between the groups of the successive rows of the nozzles, in which opened ends of adjacent channels are opposite to each other.

24. The direct methanol fuel cell according to claim 12, in which the current collector part is formed by coating Au or Au alloy on the nozzle plate.

* * * * *